(12) United States Patent
Gudlavenkatasiva et al.

(10) Patent No.: US 8,700,931 B2
(45) Date of Patent: Apr. 15, 2014

(54) METHOD AND SYSTEM FOR MANAGING POWER OF A MOBILE DEVICE

(75) Inventors: Bhaskar R. Gudlavenkatasiva, Tampa, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 43 days.

(21) Appl. No.: 13/436,156

(22) Filed: Mar. 30, 2012

(65) Prior Publication Data

US 2013/0262891 A1  Oct. 3, 2013

(51) Int. Cl.
*G06F 1/32* (2006.01)

(52) U.S. Cl.
USPC ........ 713/320; 455/414.1; 455/574; 455/522; 455/344; 455/446; 713/340; 713/310; 713/300; 713/322

(58) Field of Classification Search
USPC ............ 455/574, 41.1–41.3, 522, 414.1, 344, 455/446; 713/320, 340, 310, 300, 322
See application file for complete search history.

(56) References Cited

U.S. PATENT DOCUMENTS

| 2012/0001883 A1* | 1/2012 | Tarkoma ........................ 345/211 |
| 2012/0210325 A1* | 8/2012 | de Lind van Wijngaarden et al. ............................ 718/103 |

* cited by examiner

*Primary Examiner* — Kiet Doan
*Assistant Examiner* — Michael T Vu

(57) ABSTRACT

An approach for conserving power of a mobile device based on its pattern of use with respect to one or more tasks is described. An intelligent power source manager collects consumption information relating to a power source of a mobile device for execution of one or more tasks. A pattern of use with respect to the one or more tasks based on the collected consumption information is then determined. The intelligent power source manager then selects an action to conserve usage of the power source, according to the pattern of use, in response to subsequent execution of the one or more tasks.

12 Claims, 15 Drawing Sheets

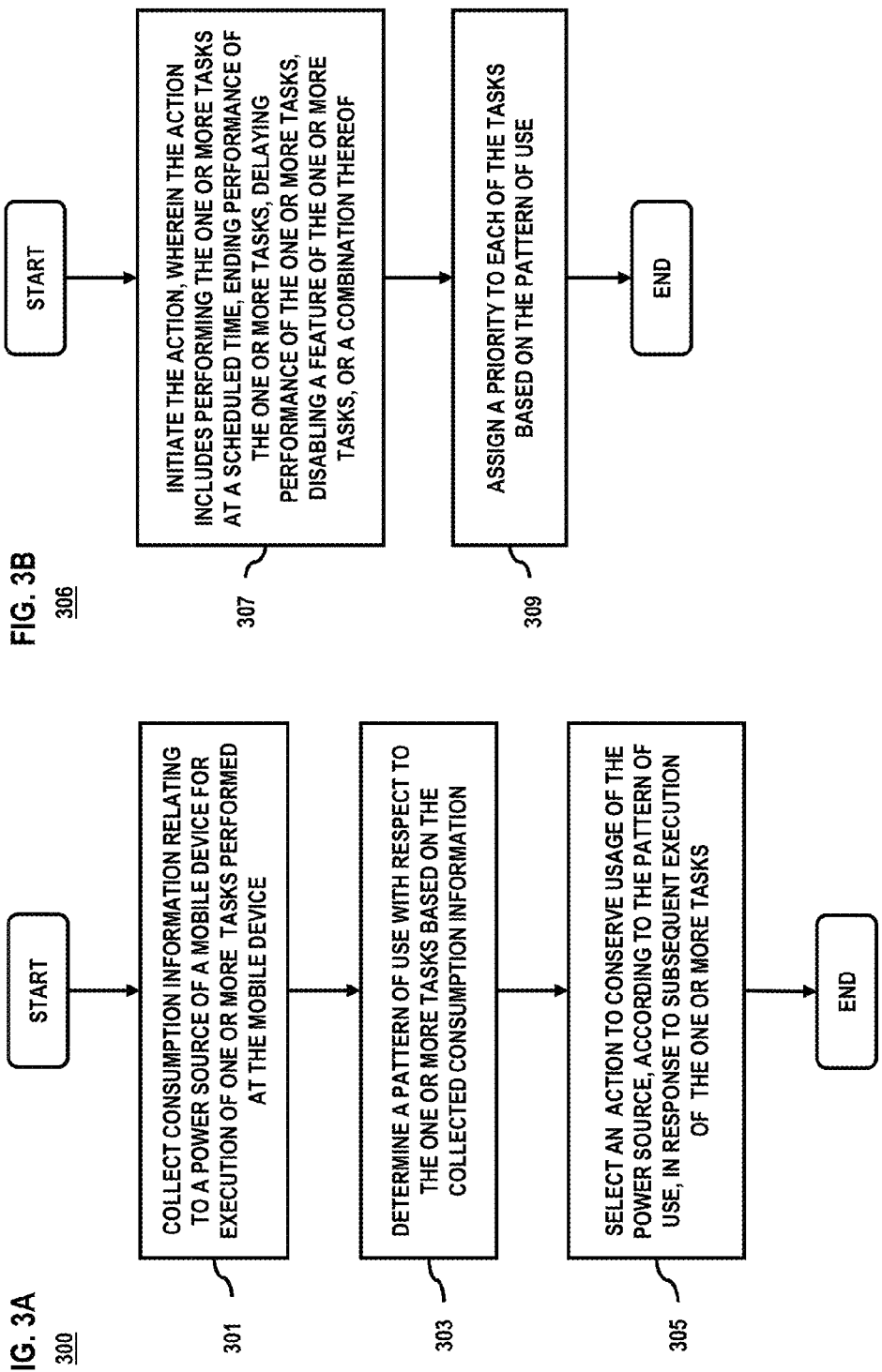

310

320

400

500

500

500

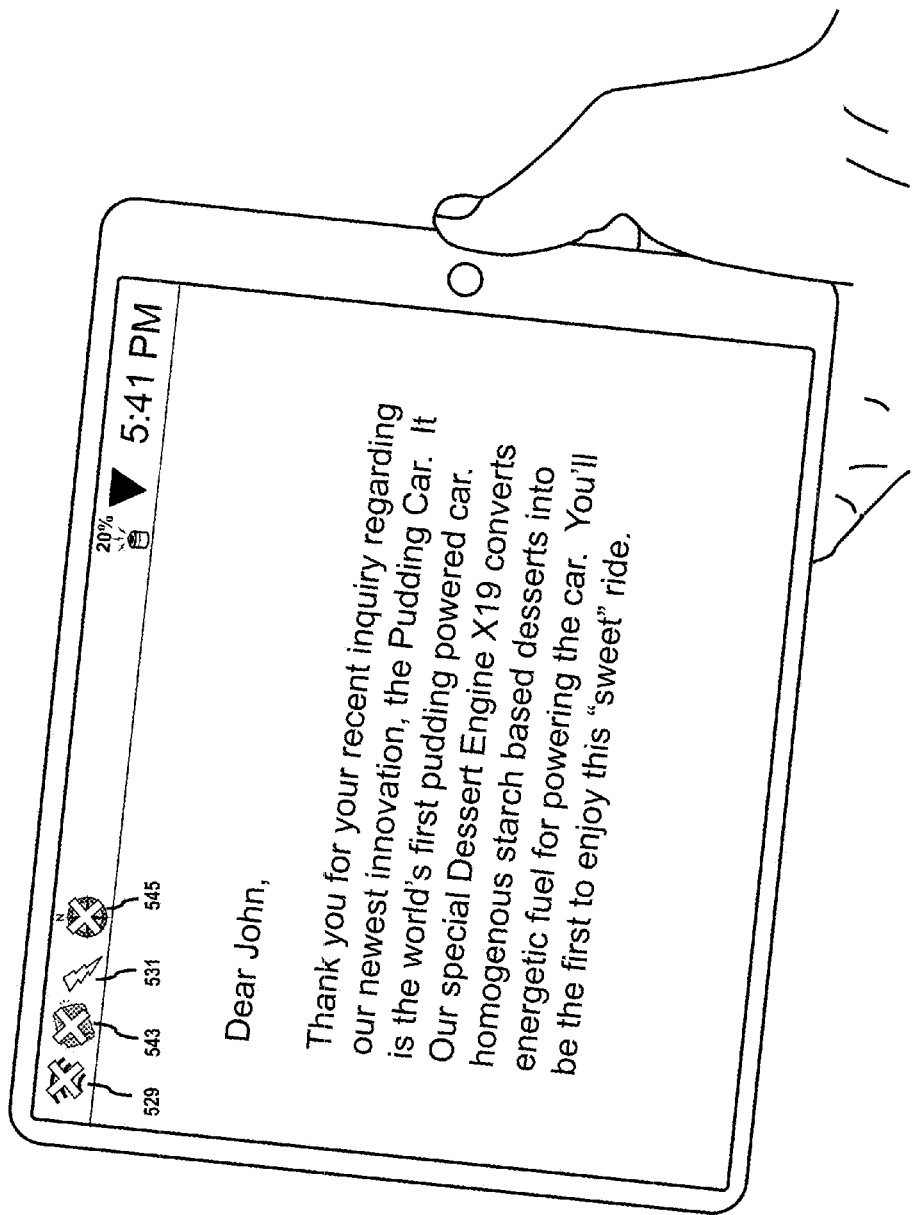

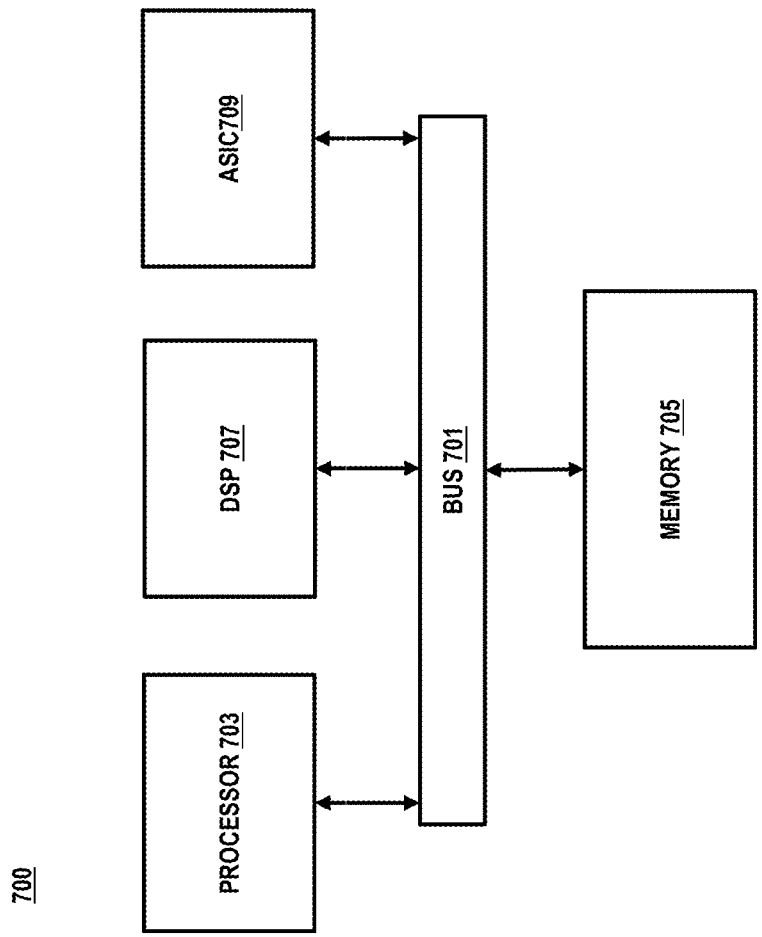

METHOD AND SYSTEM FOR MANAGING POWER OF A MOBILE DEVICE

BACKGROUND INFORMATION

Many smartphones, tablet computers, laptops and other mobile devices feature utilities and associated applications for performing a myriad of tasks that consume significant power. By way of example, certain applications are designed to continuously access content from a network source, such as a location based service, a data feed, a media content server or the like. In order to maintain up-to-date content or provide real-time functionality, these applications are required to continuously look for updates or perform content searches. Such updates require frequent use of radio circuitry, and thus are expensive in terms of power consumption. Also, these devices routinely execute multiple applications and processes. Multi-tasking taxes the device's processor(s), and correspondingly, increases power usage. Consequently, power management presents a tremendous challenge, particularly when battery life can be a real market differentiator.

Based on the foregoing, there is a need for managing power for mobile devices.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of processes for conserving power of a mobile device, according to various embodiments;

FIGS. 5A-5G are diagrams of use case scenarios of devices configured with an intelligent power source manager for conserving battery use, according to various embodiments;

FIG. 7 is a diagram of a chip set that can be used to implement an embodiment of the invention.

DESCRIPTION OF THE PREFERRED EMBODIMENT

An apparatus, method and software for conserving power of a mobile device based on its pattern of use with respect to one or more tasks of the mobile device is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
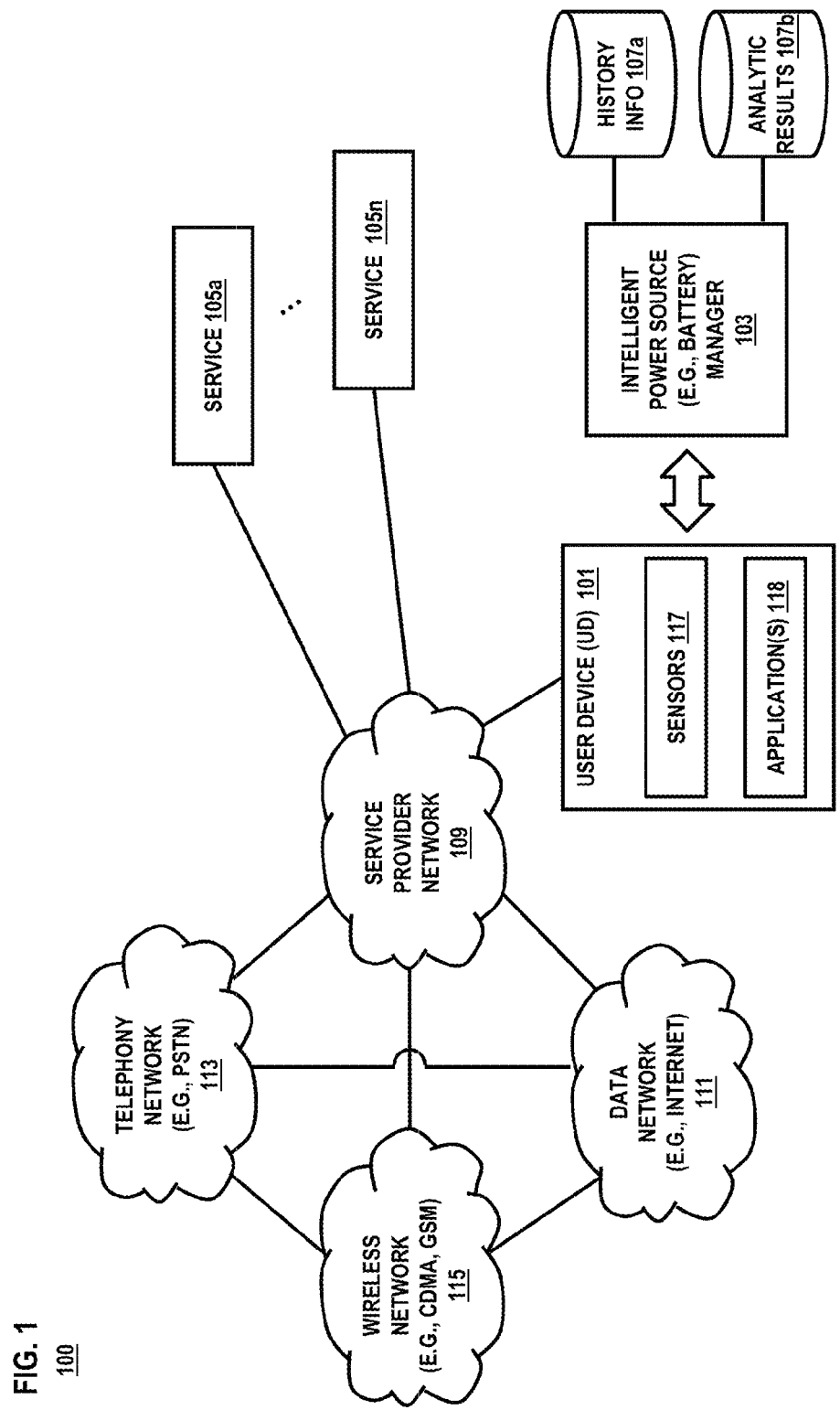
FIG. 1 is a diagram of a system for conserving power of a mobile device based on its pattern of use with respect to one or more tasks of the mobile device, according to one embodiment.

FIG. 1 is a diagram of a system for conserving power of a mobile device based on its pattern of use with respect to one or more tasks of the mobile device, according to one embodiment. For the purpose of explanation, a task includes any action performed by one or more applications, one or more services, one or more mechanisms or a combination thereof with respect to a user device 101. In certain embodiments, a task may be initiated by software or hardware and may include the execution of multiple sub-tasks and processes. By way of illustration, this may include submitting a communication request with a particular service, activating of a network client or download agent at the device, activating of an interface module, etc. As will be discussed more fully herein, an intelligent power source manager is presented to control execution of the various tasks for the purpose of more effectively consuming a power source of a user device (e.g., mobile device).

As mentioned, user devices feature different applications, utilities and device mechanisms for performing a variety of tasks, but are demanding with respect to power consumption. For example, some user devices feature applications that are configured to access a location based service via a communication network. The user can submit a request to identify their current location, receive directions, identify points-of-interest related to their present location and other on-demand information in real-time. Typically, the routing application features a network interface client that continually exchanges data with the location based service (e.g., global positioning system (GPS)) to facilitate the presentment of up-to-date routing information. This persistent interaction between the device and the service is vital to generating and preserving the real-time experience of the user. The described location based application can further cost, in terms of power, if such application is utilized by other applications (e.g., on-line gaming applications, etc.).

Moreover, many user devices and associated applications also employ the use of short-range communication technology to facilitate the exchange of data with other nearby devices and services. A Bluetooth enabled headset, for example, may interact with a smartphone or other user device to establish a pairing connection. Once the pairing connection is established, the user can use the headset to receive and transmit data, such as to facilitate phone calls, provide input commands to the user device, etc. To maintain an active connection between the devices, however, a communication client and/or calling application of the device must constantly exchange pairing information with the mobile device (e.g., persistent handshake/refreshing). Once again, this requires the mobile device to maintain an active connection.

Consequently, tasks requiring the continual accessing, updating and exchange of data also result in greater use of the power source (e.g., battery) of the mobile device. To conserve power, users can manually disable the various tasks. However, this can be a tedious, inconvenient undertaking given the frequency of execution of such tasks. Alternatively, the user can activate an Airplane Mode of operation to disable all wireless tasks. Under this approach, however, the user has no way of selecting specific wireless tasks to maintain based on their usage needs (e.g., enable Bluetooth while disabling a location based service).

Unfortunately, there is currently no means of automatically regulating and/or coordinating the execution of tasks based on, for instance, their patterns of consumption of the power source at the device. Still further, users are limited in their ability to select from multiple different modes of operation for conserving usage of the power source.

To address this issue, system 100 presents an intelligent power source manager 103 that is configured to interact with the user device (e.g., mobile device) 101 for automatically initiating one or more conservation actions. In certain embodiments, the conservation actions are initiated based on a determined current charge level of a power source of the mobile device, i.e., an internal battery. When it is determined the power source is depleted to a predetermined charge level (e.g., 20% charged), one or more conservation actions may be recommended for activation or automatically initiated by the intelligent power source manager 103. It is noted the conservation actions are performed in lieu of and/or in conjunction with a charge cycle of the user device 101 (e.g., a period of charging of the device); the actions enabling maximum preservation of and usage of available charge of a power source of the user device 101.

In certain embodiments, conservation actions are performed based on the analysis of consumption information relating to a power source of a user device 101 during execution of one or more tasks. The conservation actions of the manager 103 may include, in certain instances, performing tasks at a scheduled time or delaying execution of the tasks. For example, the task of retrieving updated content from a data feed service 105 may be delayed until the power source of the device is determined to be charged to a predetermined threshold. By delaying this task, further consumption of the power source is minimized rather than exacerbated due to persistent connectivity with the service 105. Alternatively, the task of accessing the service 105 is deliberately scheduled to occur at a typical time of charging of the user device via an external power source. By way of this approach, the task is reserved for execution at a time of least drainage of the power source.

Another conservation action performed by the manager 103 may include the ending or disabling of various tasks. For example, the task of retrieving global positioning data from a location based service may be disabled based on user selection of a task specific mode of operation of the device (e.g., a Music/Video Only Mode). By disabling the task, further attempts to retrieve and process location information are prevented without the user having to jeopardize enjoyment of the media (e.g., music and video related) content. As another example, an active connection between the device 101 and an exchange server may be ended abruptly or immediately following completion of an exchange in response to a decrease in battery consumption to a predetermined threshold. The manager 103 is configured to operate in connection with the user device 101—i.e., as an intermediary service, component or platform—for generating one or more control signals to enable execution of conservation actions relative to a given task.

In certain embodiments, the manager 103 initiates the one or more conservation actions based on analysis of historical consumption information 107a pertaining to the use of the power source of the user device 101. By way of example, the analysis is performed by the manager 103 by processing the consumption information 107a to derive a set of analytic results 107b. The analytic results 107b correspond to one or more trends, patterns, correlations and other intelligence for indicating how a user typically employs the user device 101, various applications 118 of the device, the battery, accesses one or more services 105 via a service provider network 109, or a combination thereof. It is noted, therefore, that the manager 103 accesses the analytic results 107b—which is based on historical data 107a—for use in adapting current task executions at the user device 101.

In one embodiment, the historical consumption information 107a is gathered over a period of time specified by the user. Alternatively, the information 107a is gathered over a default period of time (e.g., two weeks). For the purpose of illustration, the period of time is referred to as a training period, and includes the gathering of the following types of consumption information as shown in Table 1 below:

TABLE 1

Types of consumption information

A time at which a power source of the user device 101 is charged (e.g., connected to a wall charging unit)
A frequency of charging of the power source within a charge cycle of the power source
A typical charge level/duration of charging of the power source at a relative time (e.g., full charge, partial charge, etc.)
A duration of performance of one or more tasks at the user device 101, i.e., applications, mechanisms, clients/agents of the user device 101
A frequency and time of performance of the one or more tasks
An amount of consumption of the power source relative to the performance of the one or more tasks
Context information such as activity information, location information, network information, temporal information, etc.

Additional types of consumption information may be gathered depending on device requirements, network requirements, environmental factors and other conditions.

In certain embodiments, the manager 103 utilizes the above described consumption information to determine averages/typical patterns of usage of the power source and various tasks, thus compiling the analytic results 107b. For example, the average time of day of charging of the user device 101 may be determined as, e.g., 10 PM, corresponding to the user's normal bed time. As another example, an average frequency of charging of the device 101 may be determined as, e.g., 3 times per day. Still further, the average rate of consumption of the power source during use of an application that connects to a data service may be determined as a percentage (e.g., 13%) of overall charge capacity. In certain instances, the manager 103 may also process the consumption information against one or more models (not shown) representing specific device or task behaviors. For instance, a model representing known network access patterns of a specific brand or model of user device for a given geographic area may be compared against the consumption data. The models enable a more detailed analysis of the consumption information for a given user device 101 to be performed.

The context information collected as consumption information during the training period may also be processed by the manager 103 to further correlate specific tasks (e.g., application or device calls) with a particular device and/or user context. For example, it may be determined that the task of requesting streaming content from a media service is generally requested when the user is at their place of work. As another example, it may be determined a word processing application of the user device 101 is used more frequently during a certain time frame, e.g., 5 PM to 6:30 PM, without reliance on a network 109; while a music application that accesses an online radio service is used most frequently from 8 PM-9 PM on Wednesdays and Fridays. It is noted that the manager 103 may use the context information to refine the various conservation actions over time relative to the specific needs of the user, including determining an optimal time to schedule certain tasks or sequence tasks for execution during a given day.

In certain embodiments, the manager 103 processes the analytic results 107b to determine a prioritization of the various tasks for execution of a conservation action. By way of example, the priority is assigned by the manager 103 in order to schedule, synchronize and coordinate the conservation actions based on the usage patterns. Under this approach, certain actions are initiated prior to others for optimal conservation of the power source of the device 101.

The prioritization is carried out by the manager 103 based on various rules, all of which pertain to the consumption of the power source of the user device 101. This includes, according to certain embodiments, usage based prioritization, consumption based prioritization, and weighted average of usage based and consumption based prioritizations. With respect to usage based prioritization, tasks are prioritized based on the pattern of total usage time for each task within a charge cycle. For example, based on the historical consumption information, if a first task A has an average usage time of, e.g., 45 minutes/charge cycle, and a second task B has an average usage time of, e.g., 30 minutes/charge cycle, task A is assigned a higher priority than task B. Hence, the priority is based on the most frequently performed user device 101 tasks.

As for consumption based prioritization, tasks are prioritized based on the rate at which a given task will consume a power source of the user device 101. For example, based on the historical consumption information, if a first task A consumes a power source of the device at a rate of, e.g., 12 minutes/charge cycle and a second task B consumes battery power at a rate of, e.g., 8 minutes/charge cycle, task B is assigned a higher priority than task A. Hence, the priority is based on the most power source consuming tasks per charge cycle.

Regarding the weighted average of the above described prioritization methods, it is noted the prioritization of tasks corresponds to a sequencing and/or scheduling of the various conservation actions. Hence, as noted previously, certain tasks may be prioritized to be scheduled for execution at a later time while others may be prioritized for disablement or delay. Additionally, the actions may be prioritized for execution based on a determined condition of the mobile device or the user. For example, the prioritized executions may be triggered for execution in response to a determination of a current charge level of the power source, a current time of day, a current location of the user, etc. The manager 103 enables the conservation actions for a given task to be executed seamlessly, such that there is no interruption in use of the user device 101.

It is noted that the manager 103 may also process context information as a means of further determining the prioritization. For example, the tasks may be prioritized based on the patterns on contextual relevancy of a given task within a charge cycle. Under this approach, tasks determined not to match a particular user and/or user device 101 context are assigned higher priority than those tasks determined to match the current context of the user and/or user device 101. The context may include, for example, a particular environment of the user (workplace versus home), a specific activity of the user (business meeting versus recreation), a mode of interaction of the user device 101 with other user devices (leisurely communication versus business correspondence), etc. It is noted that contextual prioritization may be based on historical contextual patterns as determined during the training period rather than on real-time contextual processing by the manager 103 and hence, persistent activation of the sensors 117.

In certain embodiments, the manager 103 may also render messages or detail information to a display of the user device 101 for specifying the various conservation actions performed or scheduled to be performed. For example, the user may activate a conservation action viewer that lists the one or more tasks delayed and/or scheduled for execution at a later time by the manager 103. The conservation action viewer may indicate a time the one or more actions are to be performed or a condition for execution of the action (e.g., when the device is next charged via an external power supply). The viewer may also indicate an order of priority of the actions relative to a specific task to be performed.

The manager 103 may also cause the rendering of a message for indicating the conservation actions that were automatically executed by the manager 103. Under this scenario, the message is presented as a prompt or temporary notification for brief review by the user. Alternatively, a message may be presented for indicating one or more actions recommended to be executed. Under this scenario, the user is able to review the conservation actions prioritized for execution by the manager 103 before they are taken. The user then selects which actions to perform.

It is noted that user device 101 may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user device 101 can support any type of interface for supporting the presentment or exchanging of data. In addition, user devices 101 may facilitate various input means for receiving and generating information, including touch screen capability, keyboard and keypad data entry, voice-based input mechanisms and the like. Any known and future implementations of user devices 101 are applicable.

In certain embodiments, user device 101, the various services 105a-105n and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Communication network 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication network 109-115 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 113 may embody or include portions of a signaling system 7 (SS7) network, Internet protocol multimedia subsystem (IMS), or other suitable infrastructure to support control and signaling functions.

It is noted, though not shown in the figure, that in certain embodiments user device 101 may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user device 101 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
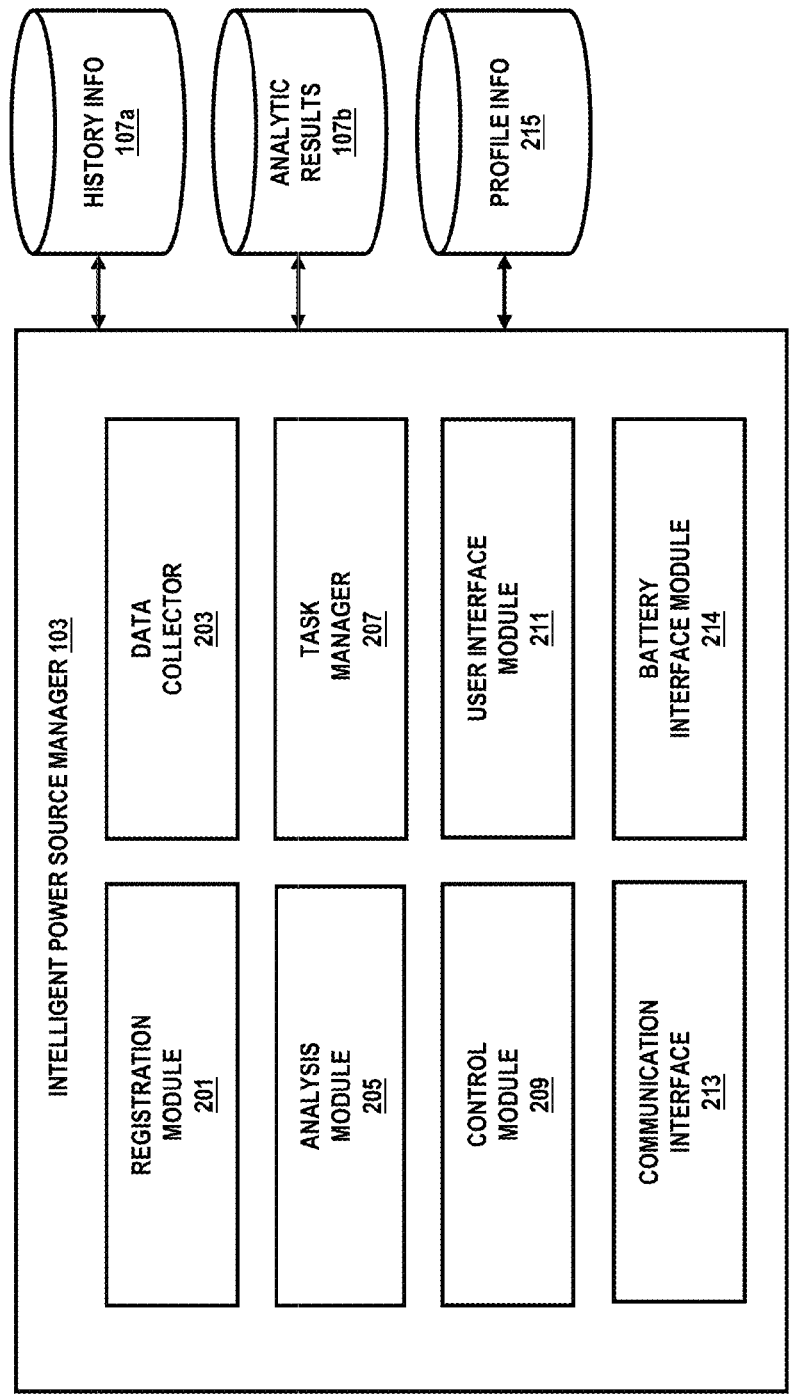
FIG. 2 is a diagram of an intelligent power source manager, according to one embodiment.
Figure 3C:
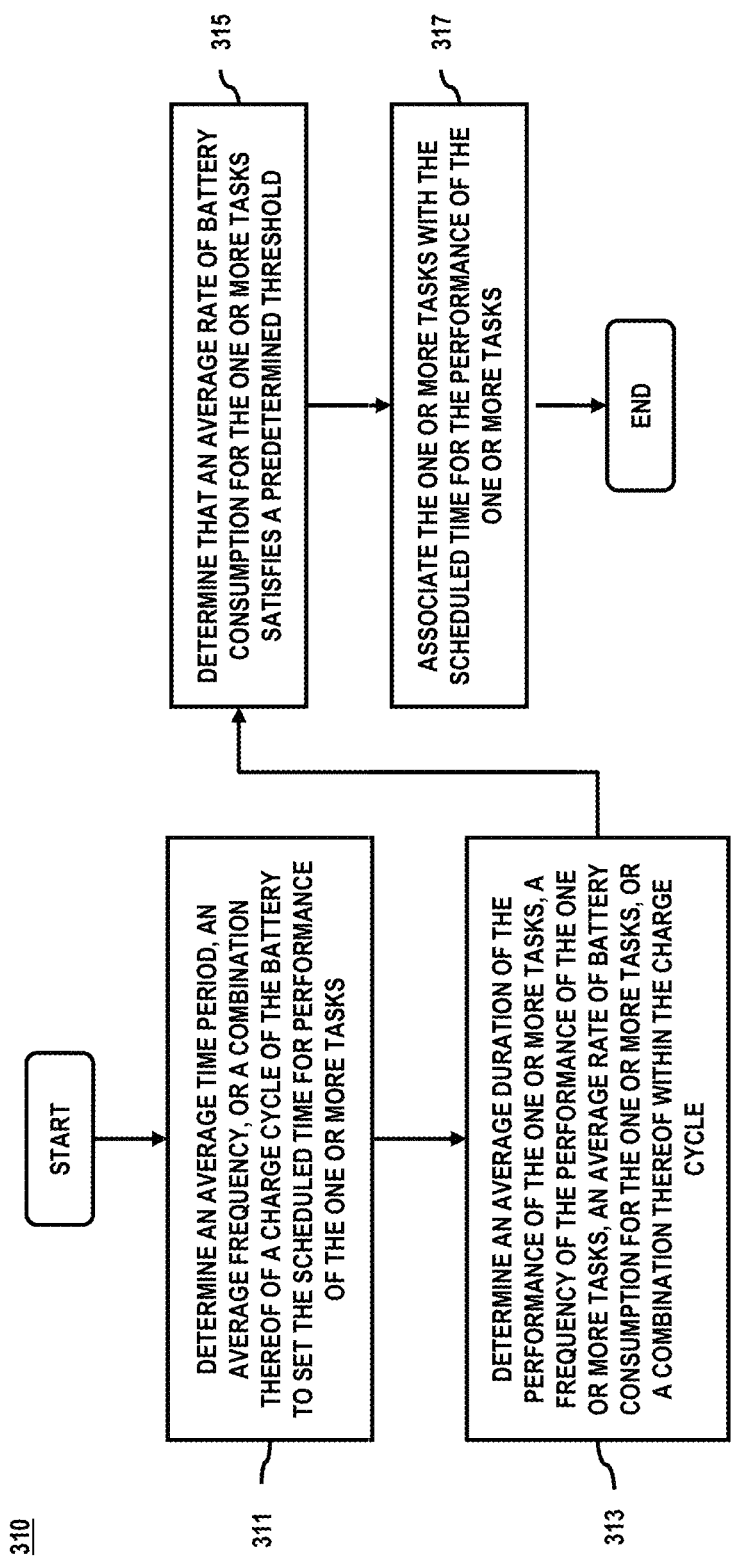
Figure 3D:
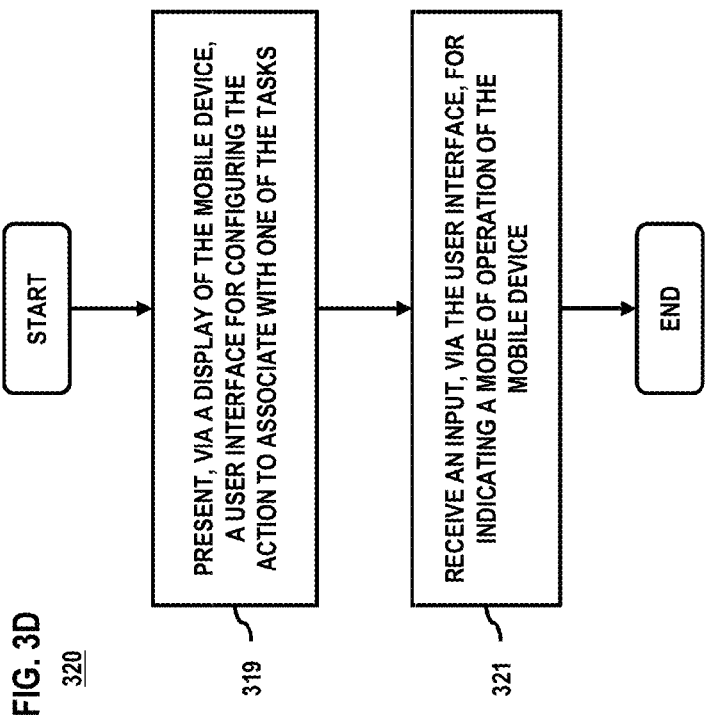

FIG. 2 is a diagram of an intelligent power source manager, according to one embodiment. The manager 103 includes various executable modules for performing one or more computing, data processing and network based instructions that in combination provide a means of enabling various power source conservation actions to be performed. Such modules can be implemented in hardware, firmware, software, or a combination thereof. By way of example, the manager 103 may include an authorization module 201, a data collector 203, an analysis module 205, a task manager 207, a control module 209, a user interface module 211, a communication interface 213 and a battery interface module 214.

In addition, the manager 103 also maintains one or more databases for performing its various executions, including a historical consumption information database 107a for storing collected consumption information. In addition, data pertaining to the analysis of the consumption information is maintained in an analytic results database 107b. Still further, profile information pertaining to the user and/or the user device 101 is maintained in a profile information database 215.

In one embodiment, an authentication module 201 authenticates users and user devices 101a-101n for interaction with the manager 103. By way of example, the authentication module 201 receives a request to subscribe to the manager via a registration interface. The registration process may include the establishing of various settings, such as a length of time of a training period for gathering of historic consumption information 107a. In addition, the user may specify the frequency of occurrence of the training period, such as to account for adaptations in the use of the mobile device, the power source or various tasks. Still further, the user may specify one or more preferences, such as a preference to enable automatic execution of various conservation actions versus presenting recommendations in advance of execution of the actions. Preferences and settings information may be referenced to a specific user, user device, or combination thereof and maintained as profile information 215.

In one embodiment, the data collector 203 collects consumption information during the established training period. This includes, for example, interfacing with various sensors 117 of the user device 101 to determine contextual information regarding the user and/or the user device 101, including temporal and location information. Data regarding the various sensors of the device may also be retrieved by the data collector 203 to determine current network activity or external device connectivity. By way of example, a sensor 117 may detect the current charging of a power source of the user device 101 by an external power source.

In addition to gathering sensor information, the data collector 203 may also operate in connection with the communication interface 213 to communicate with an application client, run-time manager, operating system application programming interface (API) or other agent of the user device 101 to determine specific task executions of the device at a given time. Under this scenario, the data collector 203 is able to determine current task executions such as an internet communication, global positioning system data exchange, media streaming activity, gaming activity, etc. It is noted that the data collector 203 generates a set of historical consumption information 107a for use in supporting analysis and pattern determination by the analysis/reporting module 205.

In one embodiment, the analysis module 205 analyzes the historical consumption information to determine one or more patterns, trends and correlations of the device. The results of the analysis are then stored as analytic results 107b. By way of example, the module 205 determines an average duration of performance of the one or more tasks, a frequency of the performance of the one or more tasks, an average rate of battery consumption for the one or more tasks, or a combination thereof within a charge cycle of the mobile device 101. In addition, the module 205 analyzes contextual information gathered by the data collector 203 for determining contextual patterns related to the user and/or the user device 101.

The analysis module 205 also determines a particular conservation action to associate with a given task based on the analysis. Hence, the decision to delay, end, disable or otherwise schedule a task is based in part on the analytic results 107b as well as the current status of the device 101. By way of example, the current status of the device 101 may pertain to an active charge cycle, a low level charge status, a critical/near shutdown status, a predetermined charge level, a mode of use of the device 101, a network connection level, etc. It is noted that while the analysis module 205 determines the one or more conservation actions to associate with a given task, the order of execution of the actions are established by the task manager 207.

In one embodiment, the task manager 207 establishes the priority to associate with the one or more task executions based on the analytic results 107b. The task manager 207 determines the priority based on various prioritization methods, including on the basis of a frequency of use of a specific task, on the basis of power source consumption or a weighted average of the two. In addition, the task manager 207 determines the various conservation actions to perform based, at least in part, on the established prioritization, the analytic results 107b, or a combination thereof. As mentioned previously, the conservation actions may include the disabling, ending or delaying of tasks at the user device 101 as well as the scheduling of various tasks for execution at an optimal time, i.e., during a charge time of the device 101.

In addition to scheduling tasks, the task manager 207 controls the queuing of conservation actions for execution by the control module 209. The queue sequence is determined by the task manager 207 to ensure effective execution of the conservation actions. Of note, certain conservation actions may need to be performed in a particular order to permit proper disablement or ending of a task in a manner that does not interfere with device 101 operations. For example, in the case of an active exchange between a push application and a push service, the queue sequence may include determining a push/feed channel status, disabling the active push/feed channel based on the status and ending the calling push application and download client. Some of these actions may be performed concurrently while others must be performed in sequential order to ensure seamless execution. The queuing may be based, at least in part, on the prioritization of the one or more tasks.

In one embodiment, the control module 209 executes the conservation actions as scheduled by the task manager 207 per the prioritization of tasks. For example, the control module 209 generates a control signal to disable, end or delay the one or more tasks specified by the task manager 207. In addition, the control module 209 also executes a conservation action at the time scheduled by the task manager 207. As such, the actions are executed in a queued, coordinated manner for maximizing the use of the power source.

Still further, the control module 209 operates in connection with a battery interface module 214. In certain embodiments, the battery interface module 214 interfaces with the power source of the device 101 to affect consumption relevant to a current task and/or established conservation action. This includes, for example, acting as a gateway between the various applications, mechanisms and other tasks of the device 101 and the power source, to regulate the power source charge settings relative to a given conservation action. The battery interface module 214 may also monitor the current charge level of the power source and convey signals to the control module 209 when the charge level reaches a predetermined threshold. Still further, the control module 209 may enable the execution of additional conservation actions, including automated activation of a particular device modality based on the determined charge level.

The control module 209 also operates with the user interface module 211 to enable user selection and activation of one or more modes of operation specific to the execution of one or more tasks. The modes of operation correspond to the selective enabling of some tasks combined with the disabling of others. For example, a Music/Video Only mode of operation enables tasks related to the processing and accessing of music and/or video content to be maintained while all other tasks such as Bluetooth, status updates, global positioning tracking and the like are disabled. As another example, a Bluetooth Only mode maintains Bluetooth connectivity and related tasks while disabling or ending all other tasks of the device 101. It is noted that the control module 209 translates input provided to the user interface module 211 pertaining to selection of a particular mode of operation into control signals for activation of one or more conservation actions.

In one embodiment, the user interface module 211 enables presentment of a graphical user interface for presenting a message regarding the one or more conservation actions performed by the control module 209. In addition, the user interface module 211 operates in connection with the task manager 207 to generate one or more recommended conservation actions. By way of example, the user interface module 211 generates the interface in response to application programming interfaces (APIs) or other function calls corresponding to the various applications 118 of the user devices 101a-101n; thus enabling the display of graphics primitives.

In one embodiment, a communication module 213 enables formation of a session over a network 109 between the manager, the application 118 and services 105a-105n. By way of example, the communication module 213 executes various protocols and data sharing techniques for enabling collaborative execution between a subscriber's user device 101 (e.g., mobile devices, laptops, smartphones, tablet computers, desktop computers) and the manager 103 over the network 109.

The above presented modules and components of the manager 103 can be implemented in hardware, firmware, software, or a combination thereof. Though depicted as a separate entity in FIG. 1, it is contemplated that the manager 103 may be implemented for direct operation by respective user devices 101. As such, the manager 103 may generate direct signal inputs by way of the operating system of the device for controlling execution of various applications and/or for controlling various device operations.

FIGS. 3A-3D are flowcharts of processes for conserving power of a mobile device based on its pattern of use with respect to one or more tasks of the mobile device, according to various embodiments. In one embodiment, the manager 103 performs processes 300, 306, 310 and 320 and is implemented in, for instance, a chip set including a processor and a memory as shown in FIG. 7.

In step 301, the manager 103 collects consumption information relating to a power source of a user device for execution of one or more tasks performed at the mobile device. As noted, the consumption information includes data such as a timing of performance of specific tasks, a frequency of performance of tasks, a timing of execution of a charge cycle of the user device 101, etc. This information may be collected during a training period as established by the user or by default by the manager 103. It is noted, in certain instances, that the user may specify initiation of the training period at a time of their choosing, such as to enable the manager to account for a change in use of the device.

Per step 303, the manager 103 determines a pattern of use with respect to the one or more tasks based on the collected consumption information. As noted previously, the pattern of use may correspond to computation of averages of the consumption information, i.e., an average rate of consumption of the power source relative to a task, an average time of performance of a task, etc. In step 305, the manager 103 selects an action to conserve usage of the power source, according to the pattern of use, in response to subsequent execution of the one or more tasks. The actions may include, for example, performing the one or more tasks at a scheduled time, ending performance of the one or more tasks, delaying performance of the one or more tasks, disabling a feature of the one or more tasks, or a combination thereof.

It is contemplated, in certain instances, that an additional conservation action may include diverting of the one or more tasks to another device of the user. Under this scenario, the manager 103 notifies the other registered device of the task or queues the task for execution at the other device. The other device, which is configured to perform the same tasks (e.g., includes the same application), performs the task upon request or as queued. For example, in response to a low charge level of a smartphone, the task of updating news content may be diverted by the manager 103 to the user's tablet device. In this instance, the manager 103 may send a wakeup notification call a content download agent associated with the same application at the tablet. By diverting high consumption tasks, the amount of useful life of the power source is extended.

In step 307 of process 306 (FIG. 3B), the manager 103 initiates the action (conservation action), wherein the action includes performing the one or more tasks at a scheduled time, ending performance of the one or more tasks, delaying performance of the one or more tasks, disabling a feature of the one or more tasks, or a combination thereof. Per step 309, the manager 103 assigns a priority to each of the tasks based on the pattern of use. As noted, the priority may correspond to an order of initiation or queuing of the conservation action.

In step 311 of process 300 (FIG. 3C), the manager 103 determines an average time period, an average frequency, or a combination thereof of a charge cycle of the battery to set the scheduled time for performance of the one or more tasks. The charge cycle corresponds to a process or duration of time for charging of the user device 101. In another step 313, the manager 103 determines an average duration of the performance of the one or more tasks, a frequency of the performance of the one or more tasks, an average rate of battery consumption for the one or more tasks, or a combination thereof within the charge cycle. Still further, in step 315, the manager 103 determines that an average rate of battery consumption for the one or more tasks satisfies a predetermined threshold. As noted previously, the averages are computed based on the historical consumption information gathered for a duration of time corresponding to the training period. The scheduled time corresponds to a period of minimal activity or charging of the device, as determined as a result of analysis of the consumption information.

Per step 317, the manager 103 associates the one or more tasks with the scheduled time for the performance of the one or more tasks. By way of example, the schedule may correspond to an average time of charging of the power source, a typical time of a specific instance of charging of the user device, or a time of occurrence of a particular device or user context. In the case of the latter, the device 101 or user context may correspond to a determination the user is located at their work environment versus their home environment. When the historical consumption information is analyzed to reveal higher use of wireless and Bluetooth related tasks at the home environment, the manager 103 can schedule certain tasks to occur when the user is at work.

In step 319 of process 320 (FIG. 3D), the manager 103 presents, via a display of the mobile device 101, a user interface for configuring the action to associate with one of the tasks. Per step 321, the manager 103 receives an input, via the user interface, for indicating a mode of operation of the mobile device 101. As noted previously, the mode of operation is based on one or more conservation actions for execution with respect to one or more tasks of the mobile device 101. The different modes of operation of the mobile device are described more fully later on with respect to FIGS. 5C and 5D.

Figure 4:
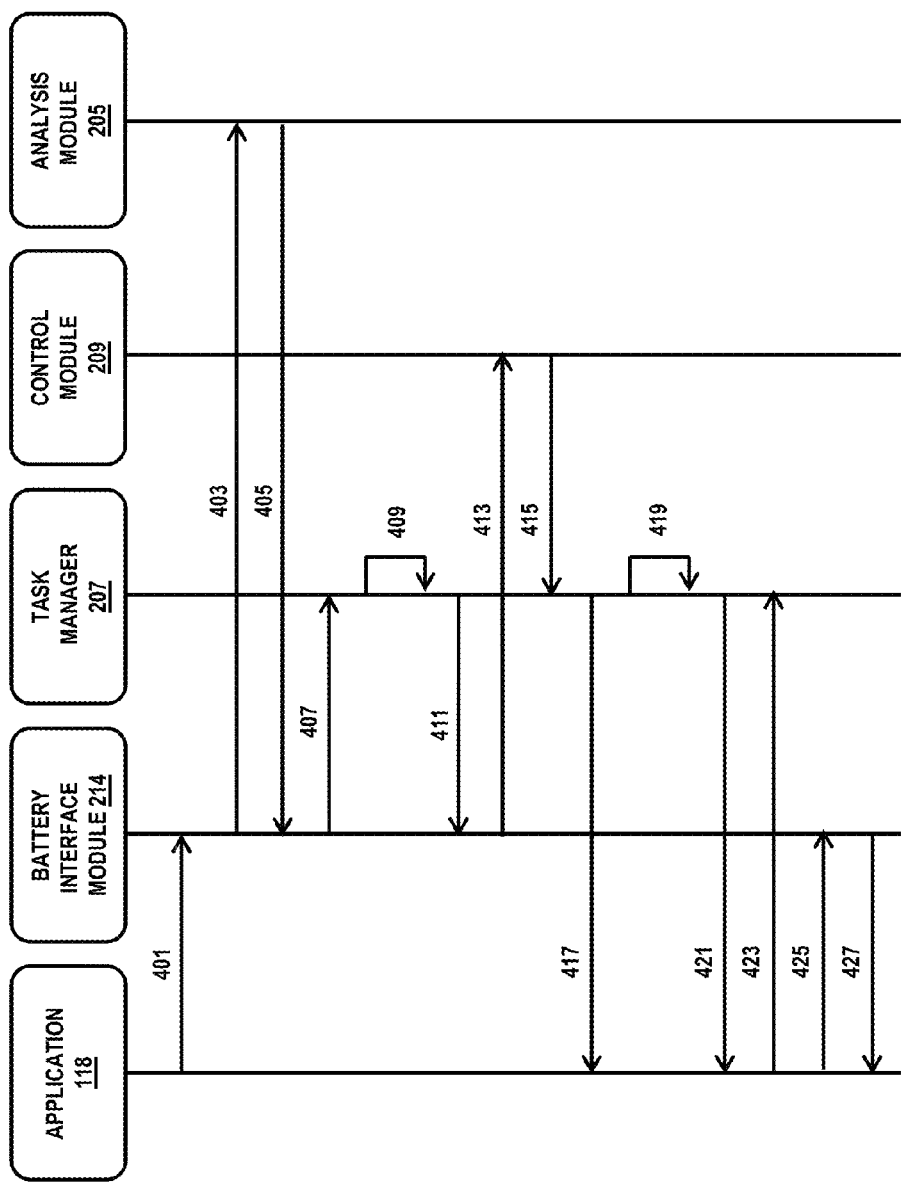
FIG. 4 is a ladder diagram depicting a process for performing an update/synchronization task of a mobile device according to the conservation processes of FIGS. 3A-3D, according to one embodiment.

FIG. 4 is a ladder diagram depicting a process for performing an update/synchronization task of a mobile device according to the conservation processes of FIGS. 3A-3D, according to one embodiment. It is noted the task of updating/synchronizing content is an example of a task requiring an active connection with a content service to be maintained. Thus, this increases the rate of consumption of the power source of the mobile device. The manager 103 may be configured for operation with respect to the mobile device to enable one or more battery conservation actions to be performed.

In step 401, an application 118 of the mobile device submits a request to perform a task. Under this scenario, the task is detected by the battery interface module 214, which then submits a request to analyze task. This includes, for example, analyzing the current usage (e.g., state, activity, frequency of use) of application via the analysis module 205. The analysis module 205 then submits the analytic results back to the battery interface module 214 per step 405, wherein the results confirm to a time based/duration based execution of the task. It is noted that when the device is configured for operation during a training period, the data collector module 203 may operate to collect consumption information regarding the task.

In steps 407 and 409 respectively, the battery interface module 214 submits a request to the task manager 207 to queue/prioritize the task and the task manager 207 associates a conservation action with the task accordingly. Once the conservation action is determined, the task manager 207 submits an acknowledgement to the battery interface module 214, corresponding to step 411. In accordance with the prioritized conservation action, the battery interface module 214 submits a request to cause a disabling of the task per step 413; disabling being the conservation action associated with the task. In response, the control module 209 generates a control signal to disable the task and then notifies the task manager of completion of the action. As a result, the task manager 207 notifies the application 118 of the completed task, corresponding to step 417. The notification may include a message that reads "Updating/Synchronization has been disabled."

In step 419, the conservation action corresponds to the scheduling of the task for later execution as opposed to ending or disabling the task. Under this scenario, the task manager 207 initiates the task at the scheduled time, i.e., an optimal time of least spending of the power source. The task manager 207, in response, notifies the application 118 to execute the task per step 421. In step 423, the application 118 responds by sending a notification to the task manager 207 that the task is now active. The battery interface module 214 then flags the task for execution in step 425, such as due to receipt of a token from the task manager 207, for indicating the task was scheduled. Subsequently, the battery interface module 214 acknowledges granting of the scheduled task, corresponding to step 427.

FIGS. 5A-5G are diagrams of use case scenarios of devices configured with an intelligent power source manager for conserving battery use based on its pattern of use with respect to one or more tasks, according to various embodiments. For the purpose of illustration, the diagrams are described with respect to an exemplary use case of a table device configured with a manager 103. It is noted that while the user interface depictions correspond to those rendered by the manager 103, the device 500 may be configured to cause presentment of various additional views based on interaction of device 500 with the intelligent power source manager 103. In addition, the various applications of the device 500 may be configured to render one or more integrated views, including one or more messages, menus and icons for representing various power conservation actions relative to the application.

Figure 5A:
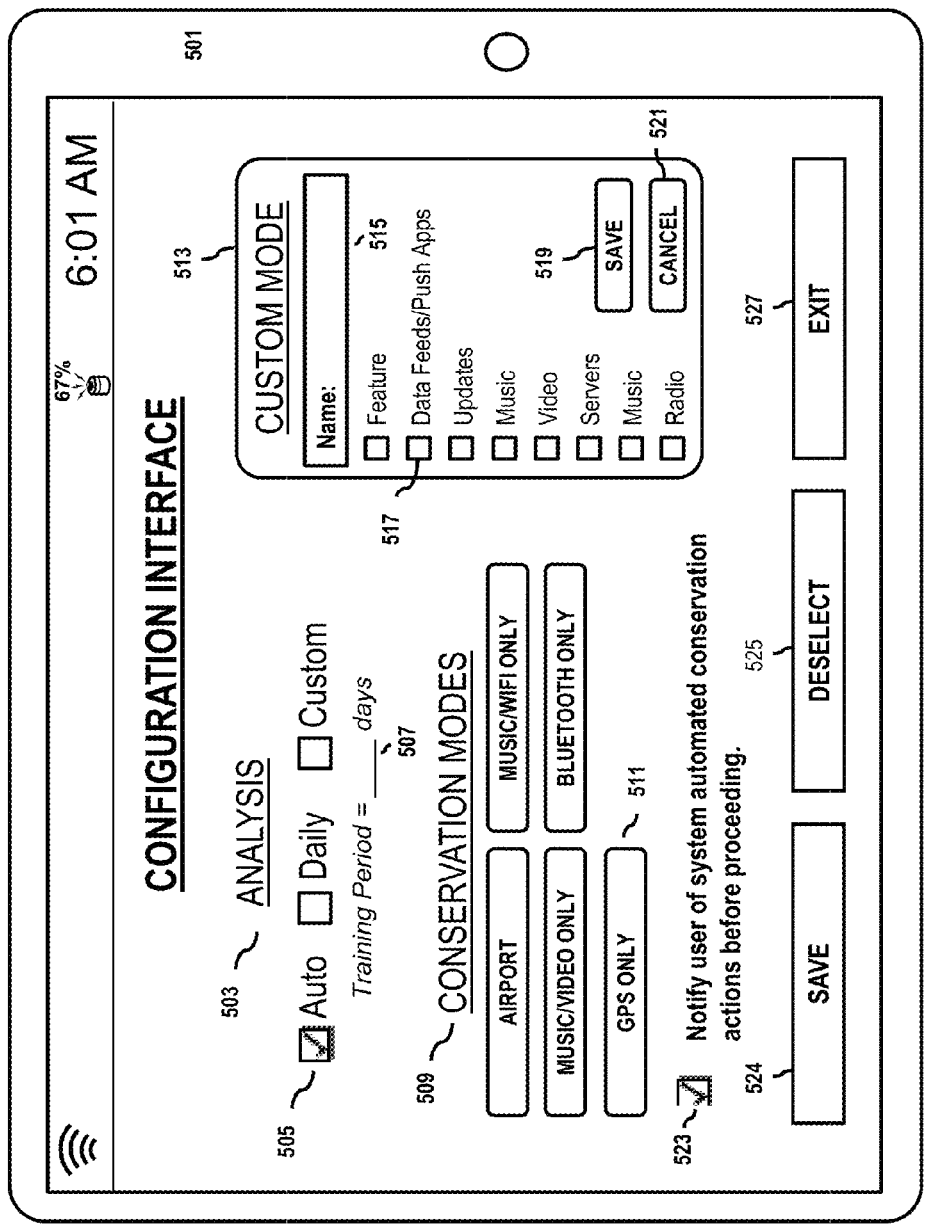

In FIG. 5A, a configuration interface of the manager 103 is rendered to a display 501 of the device 500. The configuration interface features various user selection options for establishing various manager 103 settings. By way of example, an analysis frequency setting 503 is presented for enabling the user to establish the frequency of gathering of consumption information pertaining to the device 500. One or more checkboxes, such as checkbox 505 are presented for selection by the user to indicate the frequency; corresponding to a frequency option of daily, a custom frequency or an automatic frequency set by the manager 103. Also presented is a data entry field 507 for enabling the user to specify a length of time of a training period. By way of these selection and data entry options, the user is able to configure the duration of training as well as its frequency of occurrence (e.g., every 90 days). Initial training and retraining is required for to enable the manager 103 to account for changes in use of the battery of the device 500, the addition of different applications and services, etc.

The user is also presented with a listing 509 of the available conservation modes of the device. Under this scenario, the conservation modes include, e.g., an Airport Mode for disabling all wireless communications of the device 500, a Music/Wifi Only mode for disabling all tasks except wireless communication and accessing of a music service, a Music/Video Only mode for disabling all tasks except access of a music and video service, a Bluetooth Only mode for disabling all tasks except Bluetooth communication and a GPS Only mode for disabling all tasks except a location based service. The user may select a particular mode to further configure its execution by activating a corresponding button, i.e., button 511 to configure GPS Only mode. In addition, the user may also define a customized mode of operation via a customization setting 513 of the configuration interface. The customization setting 513 includes a field 515 for enabling the user to assign a name to the mode of operation. In addition, the user may select various checkboxes (e.g., checkbox 517) for indicating the one or more tasks to be maintained (active) in accordance with the mode of operation. Once the selections are made, the user can save the settings by selecting the SAVE action button 519 or cancel the selections by selecting the CANCEL action button 521.

The configuration interface also presents a selection option, by way of checkbox 523, for the user to be notified of manager 103 initiated conservation actions before they are executed. By selecting this option, the user is presented with one or more recommendation messages for indicating a proposed conservation action. If the user opts not to select the checkbox 523, however, the conservation actions are executed automatically by the manager 103 accordingly. Once the various selection options presented at the configuration interface are made by the user, the user may save the settings by selecting the SAVE action button 524. Alternatively, the user may select the DESELECT or EXIT action buttons 525 and 527 respectively to deselect the various selection options or exit from the configuration interface.

Figure 5B:
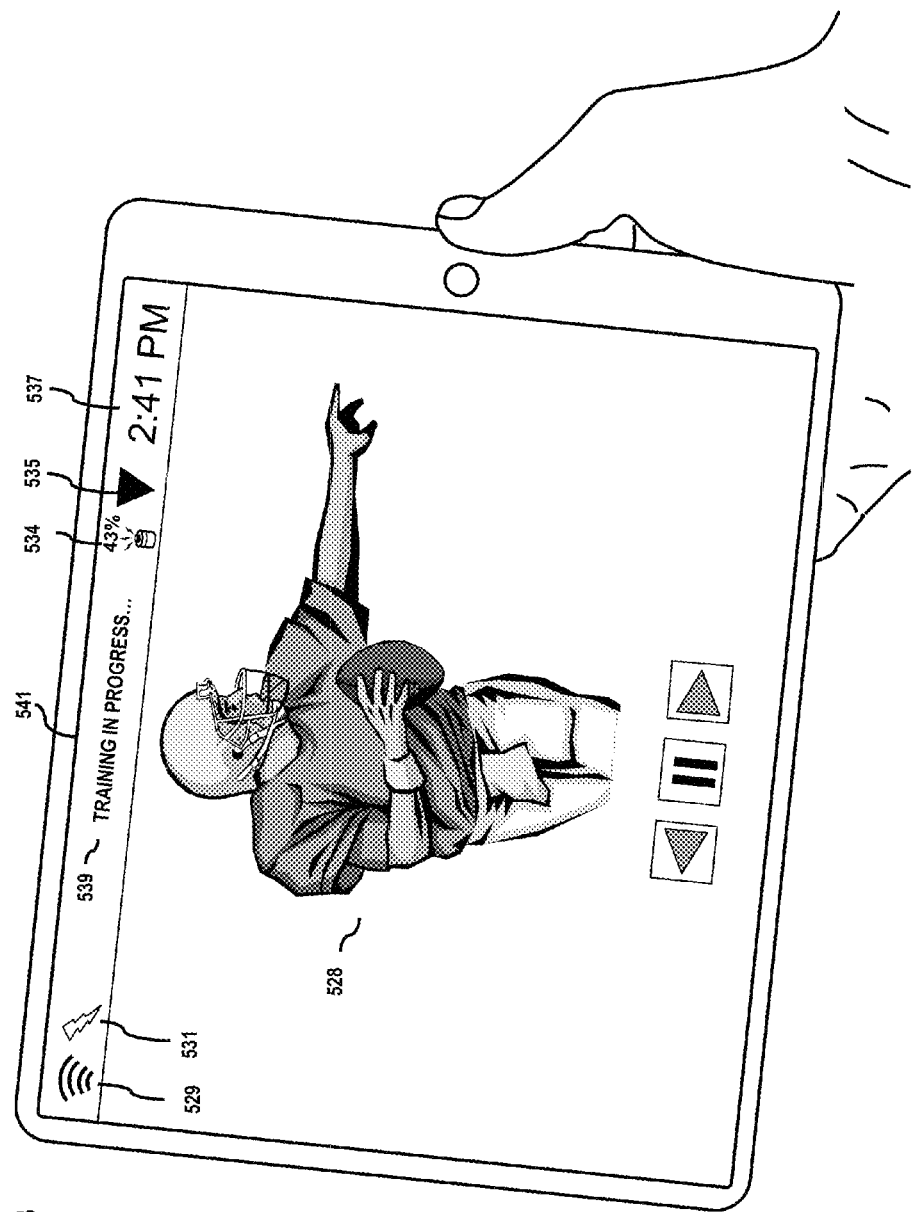

In FIG. 5B, the device 500 is shown as it is engaged in a training period. As noted with respect to FIG. 5A, the training period may be established as a number of days selected by the user or may be established by the manager 103. It is noted that the training period may be required to correspond to a minimum number of days, such that a more comprehensive historical consumption data set is collected. A longer period of time for training enables the manager 103 to more extensively analyze the consumption information to determine patterns of use of various tasks, patterns of use of the battery of the mobile device, user behavior patterns and tendencies, etc.

Under this scenario, the user is actively employing a media player application to watch video content 528. The media player application requires execution of various tasks (and subtasks) to support its execution, including accessing a content service via a network connection. An icon 529 is presented via a status bar 541 of the user interface for indicating the active connection—i.e., active status of a network client or agent of the device. In addition, another icon 531 is presented via the status bar 541 for indicating the active status of a Bluetooth connection—i.e., active status of a short range communication client or agent of the device. In this case, the device 500 is paired with a Bluetooth headset (not shown) through which the user listens to the video content 528 as it is executed.

Also presented to the status bar 541 is a current battery charge level 534, an icon 535 for activating the manager 103 and/or various functions thereof and current time information 537. Under this scenario, the manager 103 gathers information regarding the start time, end time and duration of use of the media player application. In addition, the amount of battery charge dissipated during execution of the media player application, the network connection 529 and the Bluetooth connection 531 is gathered. Still further, during the training period additional context information regarding the user and/or the device 500 may be gathered, including location information, network signal identification information, etc. This process of monitoring device 500 activity and battery consumption is repeated throughout the training period for the myriad of tasks performed. The analytic results generated as a result of this training may be stored in association with a profile of the user.

Figure 5C:
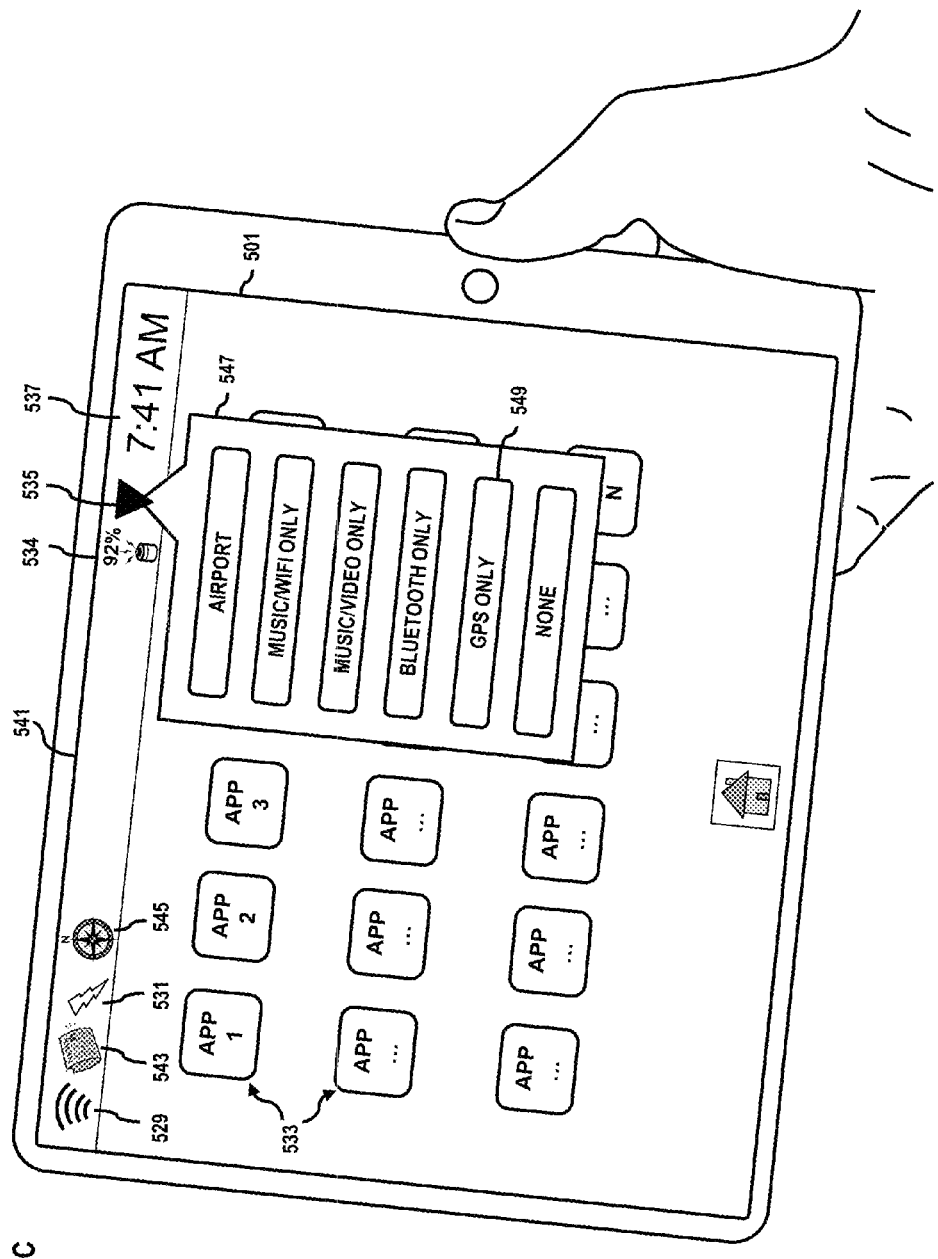
Figure 5D:
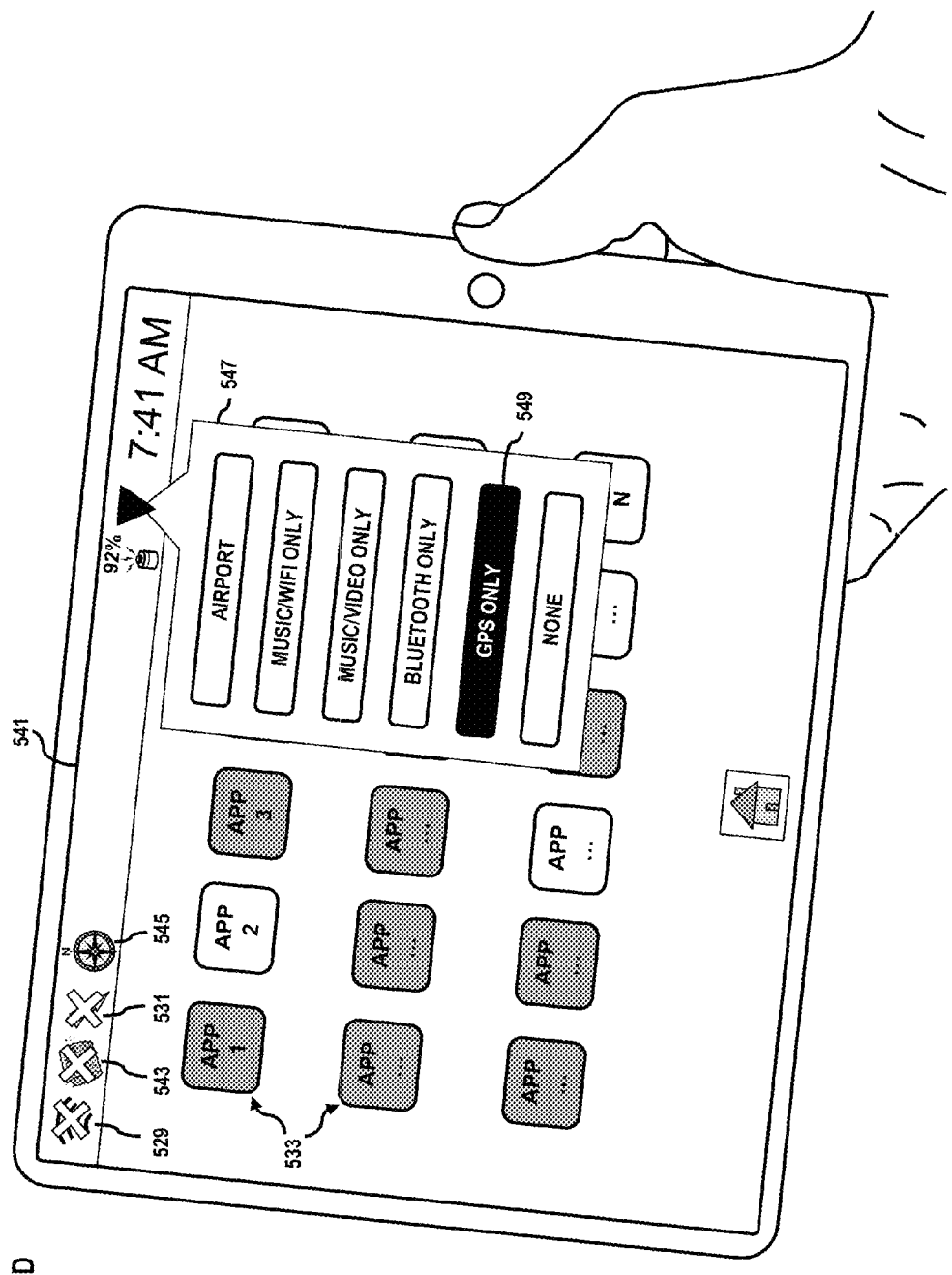

In FIGS. 5C and 5D, the user activates the manager 103 to select a specific mode of operation of the device 500. The mode of operation corresponds to one or more conservation actions for execution as a means of conserving a battery of the device 500. It is noted the modes of operation may be implemented on-demand by the user whether or not a training period has been performed by selecting the manager icon 535. Furthermore, the user may select from one or more custom modes of operation as defined via the configuration interface of the manager 103 per FIG. 5A.

Under this scenario, the user is on a long road trip and does not have access to an external power source. The device 500 currently renders the home screen to the display 501, where the user is presented with various icons 533 for launching various applications of the device 500. The task bar 541 is also presented to display current activities and/or status details regarding the device 500. Currently, one or more icons are shown for indicating an active network connection (icon 529), an active push/data feed connection (icon 543), an active Bluetooth connection (icon 531) and an active location based service (GPS) connection (icon 545). The current charge level 534 is also shown as, e.g., 92% of capacity.

Recognizing the need to conserve the battery during the long trip, the user decides to activate the manager icon 535 to launch a conservation action viewer 547. In this case, the user provides touch input to the touchscreen of the device 500. In response, the conservation action viewer 547 presents the various conservation modes available for selection/activation, e.g., as one or more action buttons. The user decides they only need access to the GPS service at the moment to continue receiving updated routing information via a routing application of the device. Resultantly, the user selects the GPS Only mode action button 549, causing the manager 103 to coordinate the prioritization/queuing of various other tasks and execution of one or more associated conservation actions.

Under this scenario, the wireless network connection (per icon 529), push/data feed connection (per icon 543) and Bluetooth connection (per icon 531) are subject to various conservation actions. For example, the Bluetooth connection and wireless network connection are rendered disabled by the manager 103, while the push/data feed is scheduled to occur at a scheduled time. In certain embodiments, the order of execution of the conservation actions may be based on use or lack thereof, the historic battery consumption rate associated with the respective tasks (e.g., disable most consuming first), or a combination thereof.

Still further, in the case of a disable conservation action being performed, the manager 103 may mark or otherwise indicate which applications of the device are affected by this action. For example, the disabling of the wireless connection, Bluetooth connection and push/data feed connection causes the icons (e.g., icon 533) representing applications that employ these features to be highlighted. The highlighting may indicate the applications are not available for launch during execution of the GPS only mode or that corresponding features of the application that require these tasks are disabled accordingly. By way of this approach, the user is provided a visual indication of the conservation action. In addition, the one or more icons 529, 543 and 531 corresponding to the various tasks are shown as disabled by virtue of an overlaid "X" mark.

Figure 5E:
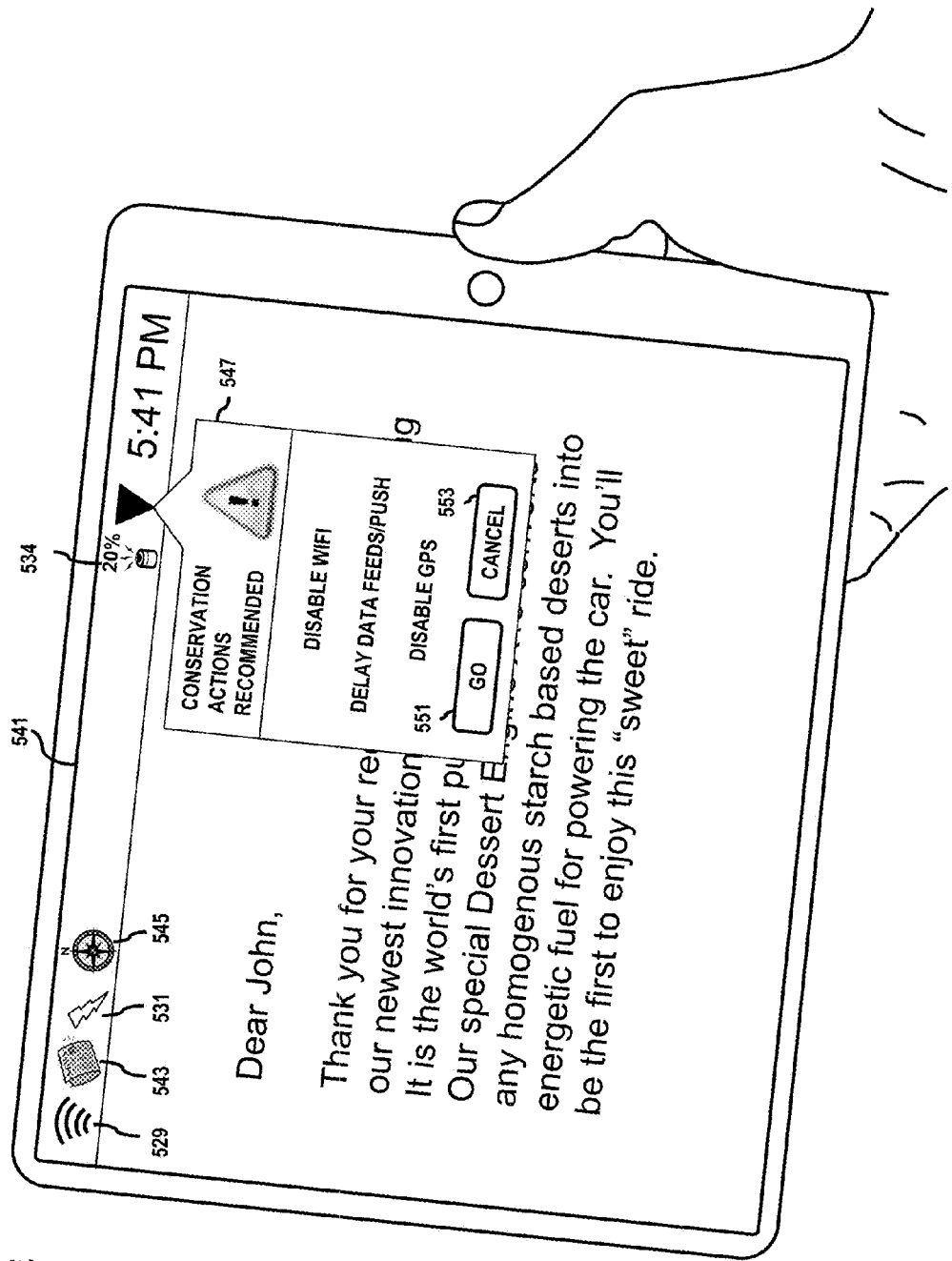

In FIGS. 5E and 5F, the manager 103 generates one or more conservation actions in response to a determined condition or state of use of the device 500. By way of this approach, the conservation action viewer 547 presents the recommendations prior to their execution. It is noted this scenario corresponds to an instance where the user selects checkbox 523 of the configuration interface.

In FIG. 5E, the user employs a word processing application of the device 500 to draft a letter for a perspective customer during their evening commute home. Historically, it is determined the user tends to utilize the word processing application during their commute period from 5:30 PM to 6:30 PM. It is also determined that the user typically types the letter using a Bluetooth connected keyboard, thus requiring active connectivity of a Bluetooth client of the device 500. For the purpose of illustration, the device 500 is not connected to an external power source and thus not in a charging state.

The task bar 541 is presented to indicate the current active state of a wireless connection (per icon 529), push/data feed (per icon 543), the Bluetooth connection (per icon 531) and the location based service connection (per icon 545). The manager 103 monitors the current battery capacity of the device 500 to determine it has been depleted to a predetermined threshold, which in this case is a 20% charge level. As a result, the manager 103 automatically generates a recommendation for execution of various conservation actions. The recommended conservation actions are presented via the conservation action viewer 547 in the order in which they are queued for execution.

In this example, the recommendations include disabling the wireless network connection, scheduling the push/data feed for a later time and disabling the location based service connection (GPS). The network connection and location based service are recommended due to assignment of these tasks as high priority by the manager 103. This prioritization is based on historical consumption patterns, which show these tasks are often active and contribute to high consumption of available battery power. In certain instances, the priority may be based on a combination both task use and consumption, such that the priority assignment accounts for different consumptions scenarios. For example, a high consumption task that is also frequently used may be assigned a lower priority during this particular time of execution, while a high battery consuming activity that is rarely used is prioritized higher for disablement/deactivation.

In the case of the push/data feed, the manager 103 schedules it to occur during a historic charge time of the device 500 (e.g., 10 PM during the user's normal bedtime). Alternatively, in the case where the user typically charges the device many times throughout the day, it is scheduled to occur during a charge time of historically limited activity of the user. For example, if the user charges the device briefly as they prepare for work, during lunch and at home before retiring, the push/data feed may be activated during the lunch period to correspond to the relative inactivity of the user during this time.

The user may select the GO action button 551 to activate all of the recommendations or the CANCEL action button 553 to cancel the recommendations and continue operating the device in its current state. Alternatively, the user may choose specific actions to execute within the list by way of touch screen activation. In this scenario, the user selects the GO action button 551 to execute all of the recommended conservation actions. As a result, the conservation actions are shown as disabled in FIG. 5F—i.e., the icons 529, 543 and 545 representing the once active tasks are shown as having an "X" overlaid upon them to represent their inactivity. Of note, the Bluetooth connection represented by icon 531 is maintained pursuant to historical consumption patterns indicating the usage of this task versus typical lack of usage of the others.

Figure 5G:
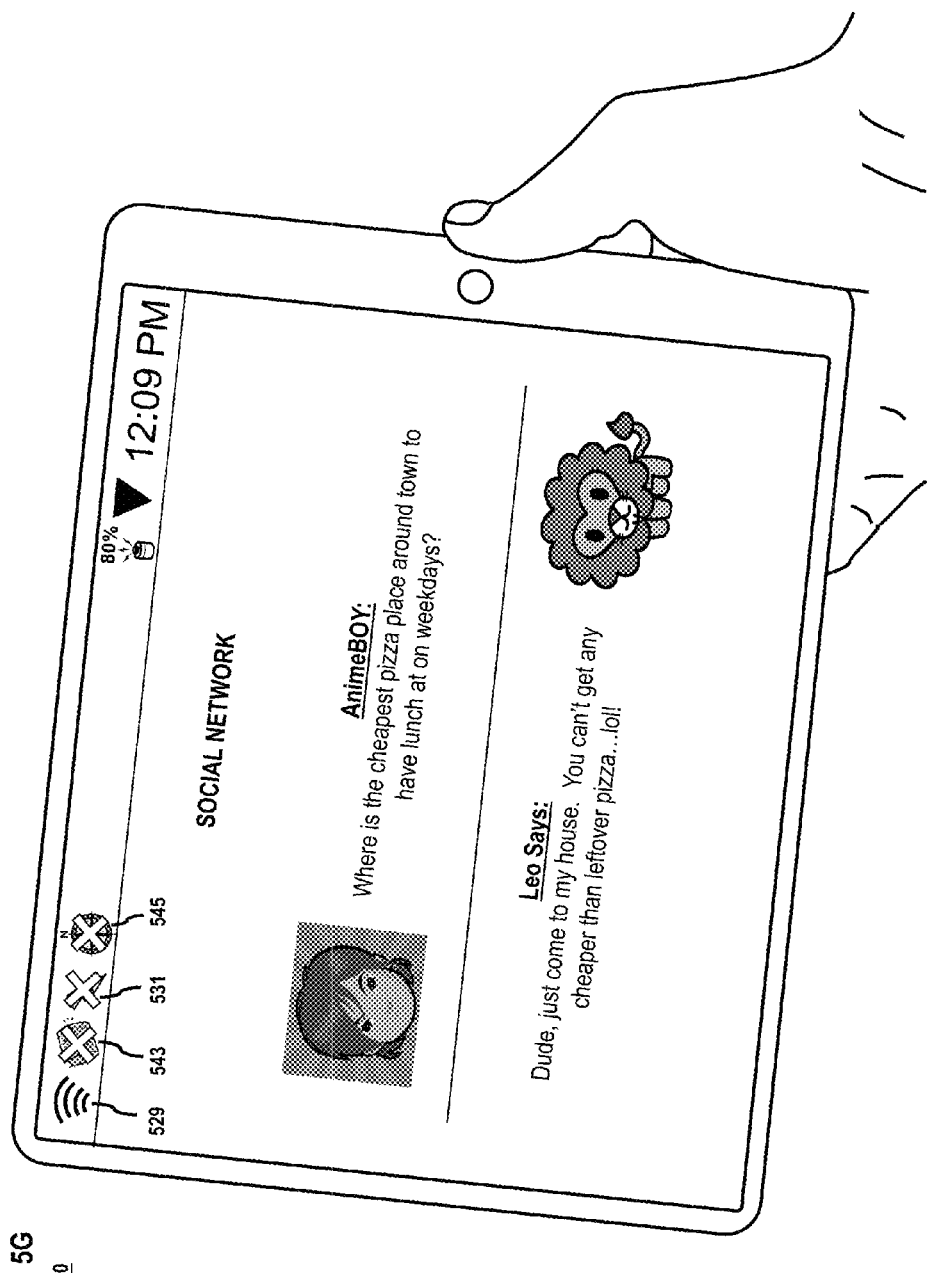

In FIG. 5G, the manager 103 enables automatic execution of one or more conservation actions. This corresponds to an instance wherein the user does not opt to select checkbox 523 for generating recommendations of conservation actions. Instead, a notification message may be presented subsequent to execution of the tasks.

By way of example, the user employs a social networking application to communicate with a friend. The social networking application accesses the service via an internet connection. It is determined by the manager 103 that the user typically engages this application and the network client for during the current time of day, i.e., 12 PM-1 PM, corresponding to the user's lunch period. Hence, the manager 103 initiates a conservation action based on this trend, including for example, scheduling of a push/data feed connection to be executed at a historic charge time of the device. Another conservation action automatically executed includes disabling of a location based service and a Bluetooth connection; both of which are not required and/or vital to the social networking application and prioritized for disablement. It is noted that the conservation actions are carried out seamlessly, with no interruption of the current use of the social networking application.

The exemplary techniques and systems presented herein enable a power source of a mobile device to be conserved. One advantage includes the ability of an intelligent power source manager to regulate and coordinate one or more conservation actions based on historical trends and patterns of use of the battery. As another advantage, the intelligent power source manager 103 enables one or more device modes to be selected by the user for accommodating different task needs at a given time while still conserving useful life of the battery. Still further, the intelligent power source manager 103 enables automatic execution of the various conservation action and/or modes with limited or no user intervention.

Accordingly to certain embodiments, the described arrangements and processes advantageously conserve power usage, and therefore, can extend battery life. Although these embodiments are explained with respect to a power source that includes a battery, it is contemplated that the processes can be employed with any power source to optimize power consumption.

It is noted that the processes described herein for conserving power of a mobile device based on its pattern of use with respect to one or more tasks of the mobile device may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
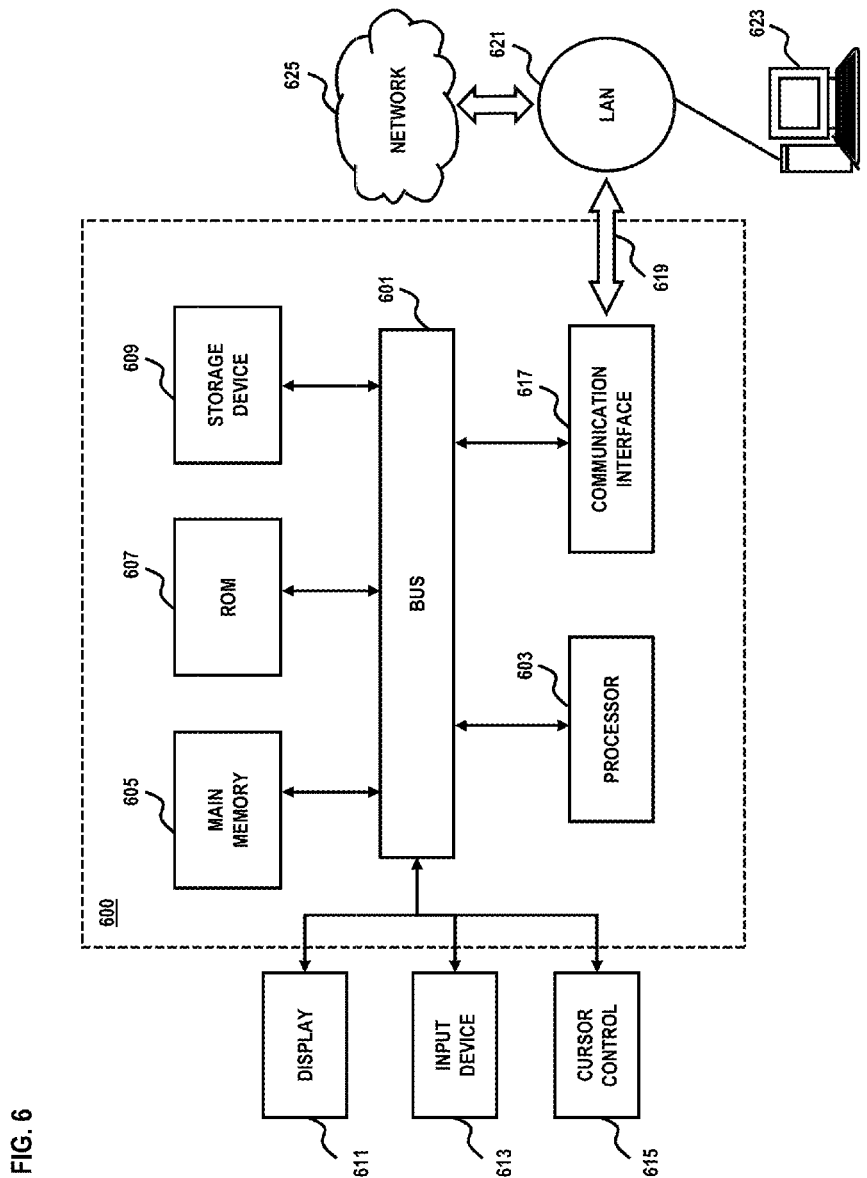
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A-5G, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to conserve a power source of a mobile device based on its pattern of use with respect to one or more tasks of the mobile device as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of conserving power of a mobile device based on its pattern of use with respect to one or more tasks of the mobile device.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to conserve a power source of a mobile device based on its pattern of use with respect to one or more tasks of the mobile device. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    collecting consumption information relating to a power source of a mobile device for execution of one or more tasks performed at the mobile device;
    determining a pattern of use with respect to the one or more tasks based on the collected consumption information;
    selecting an action to conserve usage of the power source, according to the pattern of use, in response to subsequent execution of the one or more tasks;
    initiating the action, wherein the action includes performing the one or more tasks at a scheduled time, ending performance of the one or more tasks, delaying performance of the one or more tasks, disabling a feature of the one or more tasks, or a combination thereof; and
    assigning a priority to each of the tasks based on a weighted average of a pattern of total usage time for each task within a charge cycle and a rate at which said each task will consume the power source,
    wherein an order of the initiation of the action, among a plurality of actions corresponding to the tasks, is determined according to the assigned priorities.

2. The method of claim 1, wherein the mobile device belongs to a user and the power source includes a battery, and the method further comprises:
    monitoring a current charge level of the battery; and
    diverting the one or more tasks to another device of the when the charge level of the battery reaches a predetermined threshold.

3. The method of claim 1, further comprises:
    presenting, via a display of the mobile device, a user interface for configuring the action to associate with one of the tasks.

4. The method of claim 3, further comprising:
    receiving an input, via the user interface, for indicating a mode of operation of the mobile device,
    wherein the mode of operation is based on the action.

5. The method of claim 1, wherein the one or more tasks are performed by an application, a service, a mechanism, or a combination thereof the mobile device.

6. An apparatus comprising:
    at least one processor; and
    at least one memory including computer program code for one or more programs,
        the at least one memory and the computer program code configured to, with the at least one processor, cause the apparatus to perform at least the following,
        collect consumption information relating to a power source of a mobile device for execution of one or more tasks performed at the mobile device;
        determine a pattern of use with respect to the one or more tasks based on the collected consumption information;
        select an action to conserve usage of the power source, according to the pattern of use, in response to subsequent execution of the one or more tasks;
        initiate the action, wherein the action includes performing the one or more tasks at a scheduled time, ending performance of the one or more tasks, delaying performance of the one or more tasks, disabling a feature of the one or more tasks, or a combination thereof; and
        assign a priority to each of the tasks based on a weighted average of a pattern of total usage time for each task within a charge cycle and a rate at which said each task will consume the power source,
        wherein an order of the initiation of the action, among a plurality of actions corresponding to the tasks, is determined according to the assigned priorities.

7. The apparatus of claim 6, wherein the mobile device belongs to a user and the power source includes a battery, and the apparatus is further caused to:
    monitor a current charge level of the battery; and divert the one or more tasks to another device of the when the charge level of the battery reaches a predetermined threshold.

8. The apparatus of claim 6, wherein the apparatus is further caused to:
present, via a display of the mobile device, a user interface for configuring the action to associate with one of the tasks.

9. The apparatus of claim 8, wherein the apparatus is further caused to:
receive an input, via the user interface, for indicating a mode of operation of the mobile device,
wherein the mode of operation is based on the action.

10. The apparatus of claim 6, wherein the one or more tasks are performed by an application, a service, a mechanism, or a combination thereof the mobile device.

11. A system comprising:
an intelligent power source manager configured to select an action to conserve usage of a power source of a mobile device according to a pattern of use with respect to the one or more tasks of the mobile device; and
a user interface to the intelligent power source manager for receiving an input for indicating a mode of operation of the mobile device, wherein the mode of operation is based on the action; and
a control interface for initiating the action, wherein the action includes performing the one or more tasks at a scheduled time, ending performance of the one or more tasks, delaying performance of the one or more tasks, disabling a feature of the one or more tasks, or a combination thereof,
wherein the intelligent power source manager is further configured to:
assign a priority to each of the tasks based on a weighted average of a pattern of total usage time for each task within a charge cycle and a rate at which said each task will consume the power source,
wherein an order of the initiation of the action, among a plurality of actions corresponding to the tasks, is determined according to the assigned priorities.

12. The system according to claim 11,
wherein the mobile device belongs to a user and the power source includes a battery, and
wherein the intelligent power source manager is further configured to:
monitor a current charge level of the battery; and
divert the one or more tasks to another device of the when the charge level of the battery reaches a predetermined threshold.

* * * * *